(12) United States Patent
Whyte

(10) Patent No.: US 9,530,111 B2
(45) Date of Patent: Dec. 27, 2016

(54) METHODS, SYSTEMS, AND APPARATUS FOR PERSONALIZING A WEB EXPERIENCE USING ANT ROUTING THEORY

(71) Applicant: eBay Inc., San Jose, CA (US)

(72) Inventor: Robin Whyte, York (GB)

(73) Assignee: eBay Inc., San Jose, CA (US)

( * ) Notice: Subject to any disclaimer, the term of this patent is extended or adjusted under 35 U.S.C. 154(b) by 285 days.

(21) Appl. No.: 14/069,148

(22) Filed: Oct. 31, 2013

(65) Prior Publication Data
US 2015/0121378 A1    Apr. 30, 2015

(51) Int. Cl.
| | | |
|---|---|---|
| G06F 9/46 | (2006.01) | |
| G06Q 10/00 | (2012.01) | |
| G06Q 10/06 | (2012.01) | |
| G06F 9/44 | (2006.01) | |

(52) U.S. Cl.
CPC ............. *G06Q 10/0633* (2013.01); *G06F 9/44* (2013.01); *G06F 9/4421* (2013.01); *G06F 9/4425* (2013.01); *G06F 9/46* (2013.01); *G06Q 10/00* (2013.01); *G06Q 10/06* (2013.01)

(58) Field of Classification Search
None
See application file for complete search history.

(56) References Cited

U.S. PATENT DOCUMENTS

| | | | | |
|---|---|---|---|---|
| 2003/0018646 A1* | 1/2003 | Ohta | ................. | G06F 17/30908 |
| 2005/0256818 A1 | 11/2005 | Sun et al. | | |
| 2008/0183517 A1* | 7/2008 | Hamadi | ................. | G06Q 10/06 705/7.13 |
| 2008/0183538 A1* | 7/2008 | Hamadi | ................. | G06Q 10/06 705/7.14 |
| 2008/0306800 A1* | 12/2008 | Liu | ......................... | G06Q 10/06 705/7.15 |
| 2009/0018983 A1* | 1/2009 | El-Rafei | ............. | G06F 11/0715 706/12 |
| 2009/0125884 A1* | 5/2009 | Hsu | ........................ | G06Q 10/06 717/120 |
| 2009/0300056 A1* | 12/2009 | Fu | ..................... | G06F 17/30938 |
| 2013/0021382 A1* | 1/2013 | Morlock | ................ | G01C 21/32 345/672 |
| 2014/0007127 A1* | 1/2014 | Amir | ...................... | G06Q 10/06 718/104 |

FOREIGN PATENT DOCUMENTS

WO    WO-2015066043 A1    5/2015

OTHER PUBLICATIONS

"International Application Serial No. PCT/US2014/062677, International Search Report mailed Feb. 18, 2015", 2 pgs.
"International Application Serial No. PCT/US2014/062677, Written Opinion mailed Feb. 18, 2015", 4 pgs.

* cited by examiner

*Primary Examiner* — Charles Swift
(74) *Attorney, Agent, or Firm* — Schwegman, Lundberg & Woessner, P.A.

(57) ABSTRACT

Methods, systems, and apparatus for using ant theory to personalize a workflow are described. One or more path segments in a data structure that represents a workflow may be identified, the one or more path segments corresponding to a path traversed by a user. A weight associated with each of the identified one or more path segments in the data structure may be increased. One or more weights in the data structure associated with a plurality of path segments may be decreased based on a temporal decay rate. A guidance activity that directs a user to a more heavily weighted path at a workflow decision point may be established.

16 Claims, 8 Drawing Sheets ns, and more specifically, in one example, to per-
METHODS, SYSTEMS, AND APPARATUS FOR PERSONALIZING A WEB EXPERIENCE USING ANT ROUTING THEORY

TECHNICAL FIELD

The present application relates generally to personalizing workflows, and more specifically, in one example, to personalizing a web experience using ant routing theory.

BACKGROUND

A growing variety of online applications are enabling users to perform an increasing number of tasks online. For example, consumers often shop online for a wide variety of products and services and may conduct searches for information, such as pricing information, for items. Users may take a variety of paths in the workflow between initially accessing an application, such as an electronic commerce application, and successfully completing a task, such as purchasing a desired item. Some users quickly find a path through a web-based workflow to complete their task and achieve their goal, while other users may take an indirect path to achieving their goal, may be forced to backtrack or start over or, in some cases, may simply abort a task before achieving their goal. For example, some consumers searching for a product and/or service may quickly find what they are seeking for and execute a transaction, while other consumers abort a shopping experience before making a purchase.

Consumers of products and services may generally include individuals, retail consumers, distributors, small business owners, business representatives, corporate representatives, non-profit organizations, and any other consumer of a product and/or service. The providers of the products and services may offer to provide the product and/or service to the consumer. The providers may include individuals, retailers, wholesalers, distributors, manufacturers, service providers, small business owners, independent dealers, and the like.

BRIEF DESCRIPTION OF THE DRAWINGS

Some embodiments are illustrated by way of example and not limitation in the figures of the accompanying drawings in which.

DETAILED DESCRIPTION

Figure 1:
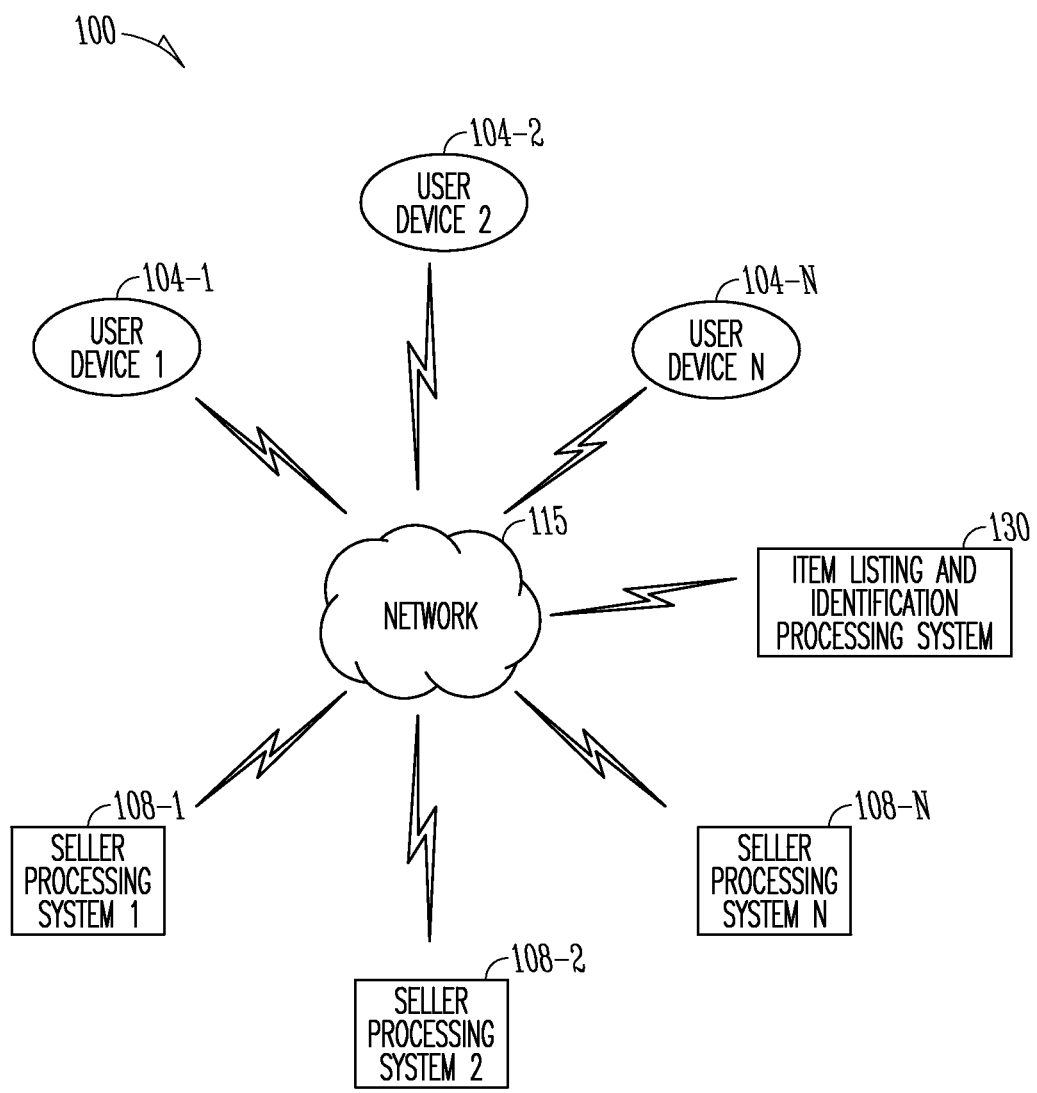
FIG. 1 is a block diagram of an example system, in accordance with an example embodiment, for personalizing a web experience in an electronic commerce marketplace.

In the following detailed description of example embodiments, reference is made to specific examples by way of drawings and illustrations. These examples are described in sufficient detail to enable those skilled in the art to practice these example embodiments, and serve to illustrate how the invention may be applied to various purposes or embodiments. Other embodiments of the invention exist and are within the scope of the invention, and logical, mechanical, electrical, and other changes may be made without departing from the scope or extent of the present invention. Features or limitations of various embodiments of the invention described herein, however essential to the example embodiments in which they are incorporated, do not limit the invention as a whole, and any reference to the invention, its elements, operation, and application do not limit the invention as a whole but serve only to define these example embodiments. The following detailed description does not, therefore, limit the scope of the invention, which is defined only by the appended claims.

Generally, methods, systems, and apparatus for personalizing a workflow experience are described. In one example embodiment, ant routing theory is used to guide a user through a personalized web experience. For example, a user may be guided to one or more optimal paths through a workflow that are likely to lead to a successful completion of a task or to achieving a goal. In one example embodiment, a consumer may be guided to one or more optimal paths through an electronic commerce workflow that are likely to lead to purchasing a desired item. As used herein, an "item" may refer to a product and/or service.

In one example embodiment, paths through a workflow that are followed by users who successfully complete a task or achieve a goal are tracked and are used as a template for guiding other users through the workflow. In one example embodiment, the paths through the workflow are processed according to ant routing theory. Ant routing theory refers to a model based on the natural behavior of ants. In nature, ants walk randomly in different directions in search of food. An ant that locates food returns to the colony, laying down pheromone along the return path. Other ants that randomly encounter the trail while walking may follow the pheromone and therefore the path to the food source. These other ants may deposit additional pheromones and may therefore reinforce the pheromones of the initial ant, thereby encouraging more ants to follow the path. If another randomly walking ant discovers an alternate route to the food source, its path may be followed by other ants and may also become a path reinforced by subsequent ant traffic.

Over time, the deposited pheromones slowly evaporate and become less attractive to other ants. Since an ant will traverse a shorter path more quickly than a longer path, the shorter path will have a higher density of pheromone than the longer path, thereby attracting more ant traffic. Eventually, the shorter path may acquire a larger and larger percentage of the ant traffic until substantially all of the ants are following the shorter, more efficient path. Moreover, if a new food item is discovered or a threat is encountered by an ant, the ants may quickly migrate to a more optimal path.

In a similar manner, the paths of users through a workflow, such as a web-based workflow, may be monitored and used to direct other users to a preferred path. Each traversal of a path through a workflow may be used to add weight to each traversed segment of the path in a manner similar to an ant adding pheromone to a trail. Similarly, the weight may be allowed to decay over time to simulate the evaporation of the pheromone deposited by an ant. The weight may indicate how likely a path segment is to be part of a successful route, and the weight may increase as a result of the traversal of the path by a user, but may also decay and get weaker over time. As hundreds or thousands of users traverse a web-based workflow, the weight starts to build up for busy routes and, for the most successful routes, the weight builds up even more. The weight of the less successful routes may decay and become weaker; eventually, the less successful routes may become less attractive paths. The result is a set of paths through the web-based workflow where the paths, or path segments, that are more likely to lead to a successful completion of a task or achievement of an objective are more heavily weighted than other paths.

In one example embodiment, a user may be guided down one or more of the more heavily weighted paths via a personalized experience. For example, a banner may be presented on a web page at a key decision point in the workflow, where the banner will lead a user to one of the more heavily weighted paths. As used herein, a decision point is a point in a workflow where a user is presented with one or more optional paths to follow. Moreover, just as ants quickly adjust to new food sources and threats, users may quickly adjust as the model may adapt to changes in the workflow and may continue to provide a personalized experience. The model thereby may correct over time to emphasize the most successful paths.

In one example embodiment, the weights may be calibrated and re-calibrated over time. For example, the weights on a set of paths may be normalized. In one example embodiment, the weights on one or more paths may be normalized on a non-linear scale, where the heavier weights are increased by a larger percentage in comparison to the lighter weights. In one example embodiment, paths whose weights are below a weight threshold may be not considered for user guidance purposes and/or may be deleted.

Once established, a set of paths may be utilized for a variety of services. In one example embodiment, a marketing team may identify a location in a path where a marketing effort should be performed. For example, if there is a point in a path where a user's next step is to purchase a vacation package, a marketing team may advertise a travel insurance service.

In one example embodiment, a sales team may identify a location in a path where a consumer may view a style of a shirt for sale, may then view different colors of the shirt, and may finally select a desired color. If the path weights show that a selection of the color blue leads to a greater number of complete sales, the sales team may display a blue shirt in the first step, thereby increasing the likelihood that a consumer will continue to traverse the workflow beyond the first step.

In one example embodiment, a sales team may recognize a location in a path where consumers make a decision to purchase an item and where the next step is to select a payment method. If the path corresponding to selecting a credit card payment leads to a greater number of completed sales, the sales team may present a credit card option(s) in the first step, thereby increasing the likelihood that a consumer will continue to traverse the workflow beyond the first step.

In the above scenarios, a latter part of a workflow may be personalized based on the set of established paths and data representing a data structure corresponding to the workflow and defining a relative position in the data structure corresponding to a user's position in the workflow.

FIG. 1 is a block diagram of an example system 100, in accordance with an example embodiment, for personalizing a web experience in an electronic commerce marketplace. In one example embodiment, the system 100 may comprise one or more user devices 104-1, 104-2 and 104-N (known as user devices 104 hereinafter), one or more seller processing systems 108-1, 108-2 and 108-N (known as seller processing systems 108 hereinafter), an item listing and identification processing system 130, and a network 115. Each user device (e.g., 104-1) may be a personal computer (PC), a tablet computer, a mobile phone, a personal digital assistant (PDA), a wearable computing device (e.g., a smartwatch), or any other appropriate computer device. Each user device (104-1, 104-2 or 104-N) may include a web browser program. Although a detailed description is only illustrated for user device 104-1, it is noted that each of the other user devices (e.g., user device 104-2 through user device 104-N) may have corresponding elements with the same functionality.

The seller processing systems 108 and the item listing and identification processing system 130 may be a server, client, or other processing device that includes an operating system for executing software instructions. Each seller processing system 108 may include a seller transaction processing module 610, described more fully below in conjunction with FIG. 6.

The network 115 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, another type of network, a network of interconnected networks, or a combination of two or more such networks.

Each user device 104 may receive a query for item information from a user via an input device such as keyboard, mouse, electronic pen, and the like (not shown in FIG. 1). An item may comprise a product and/or a service, and the corresponding information may be in the form of an item listing.

An item listing and identification processing system 130 of an online listing system may store and/or obtain item listings. Each item listing may comprise a detailed description for an item. The item associated with an item listing may be a good or product (e.g., a tablet computer) or service (e.g., a round of golf or appliance repair) that may be transacted (e.g., exchanging, sharing information about, buying, selling, making a bid on, and the like). The item listing may include a title, a category (e.g., electronics, sporting goods, books, antiques, and the like), and other tag information (e.g., color, size, and the like).

Referring back to the user device 104-1, the query received from the user of user device 104-1 may comprise one or more keywords. The user device 104-1 may submit the query to the item listing and identification processing system 130 via the network 115. The item listing and identification processing system 130 may attempt to match the query keywords with the title, the category, the tag information, and/or any other field in the item listing using a search engine.

In response to the submission of the search query, the item listing and identification processing system 130 may attempt to identify one or more item listings that satisfy the query. The item listing and identification processing system 130 may retrieve and may sort the item listings in the search result in a known manner. The item listing and identification processing system 130 may then return a sorted search result to the user device 104-1 that submitted the query.

The consumer may accept one or more offers in a known manner, or may reject all presented offers due to the price and/or terms of the offer.

Figure 2:
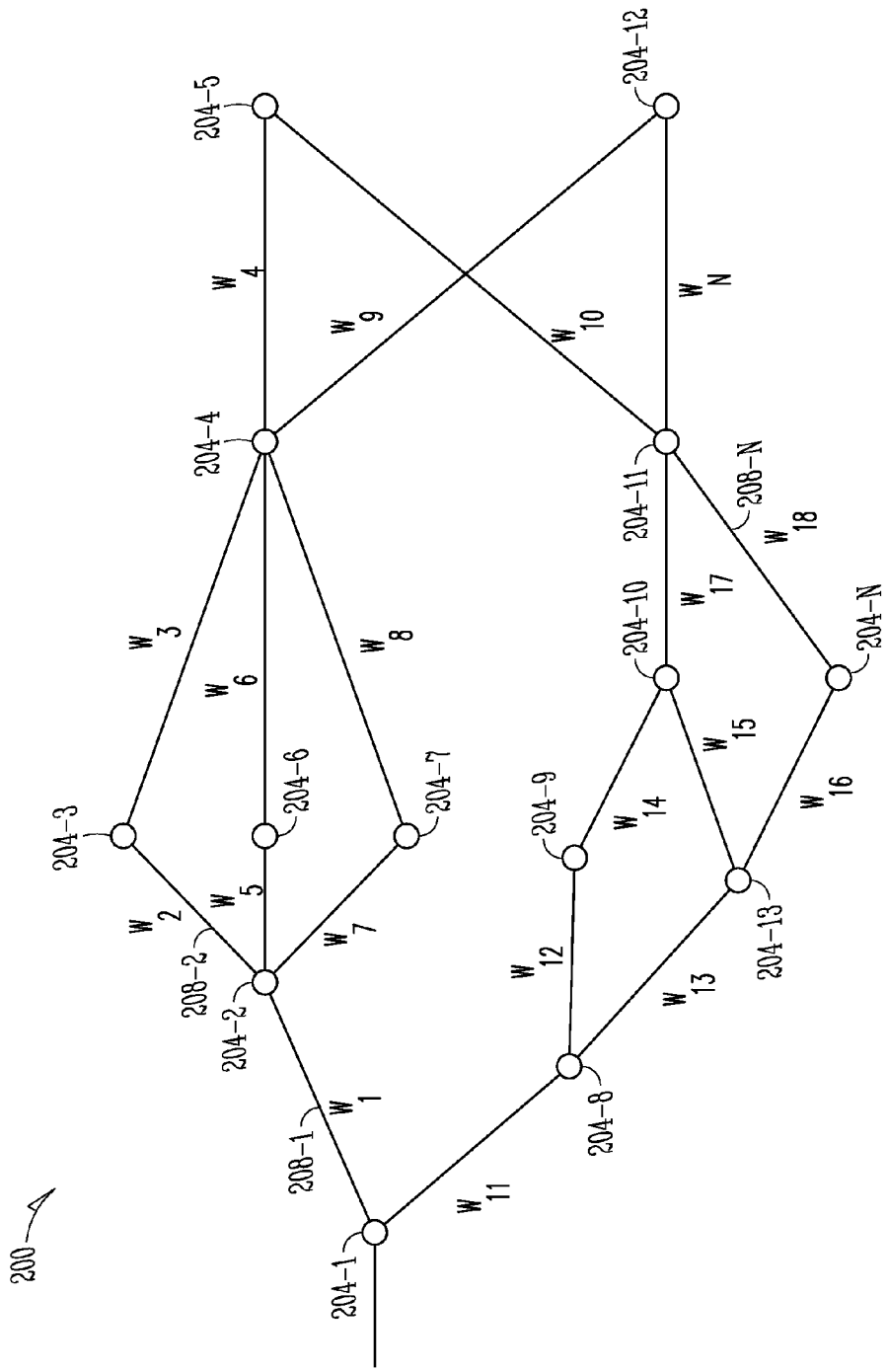
FIG. 2 is a representation of an example set of paths in a workflow, in accordance with an example embodiment.

FIG. 2 is an example representation of a set of paths 200 in a workflow, in accordance with an example embodiment. Each node 204-1, . . . , 204-N represents a decision point in the workflow. Each path may comprise one or more path segments 208-1, . . . , 208-N. A weight $W_1, \ldots, W_N$ may be assigned to each path segment, may be increased in response to a traversal of the corresponding path segment by a user, and may be decreased in accordance with a decay formula, as described more fully below. In one example embodiment, a workflow data structure is defined to represent the set of paths 200 of the workflow.

Figure 3:
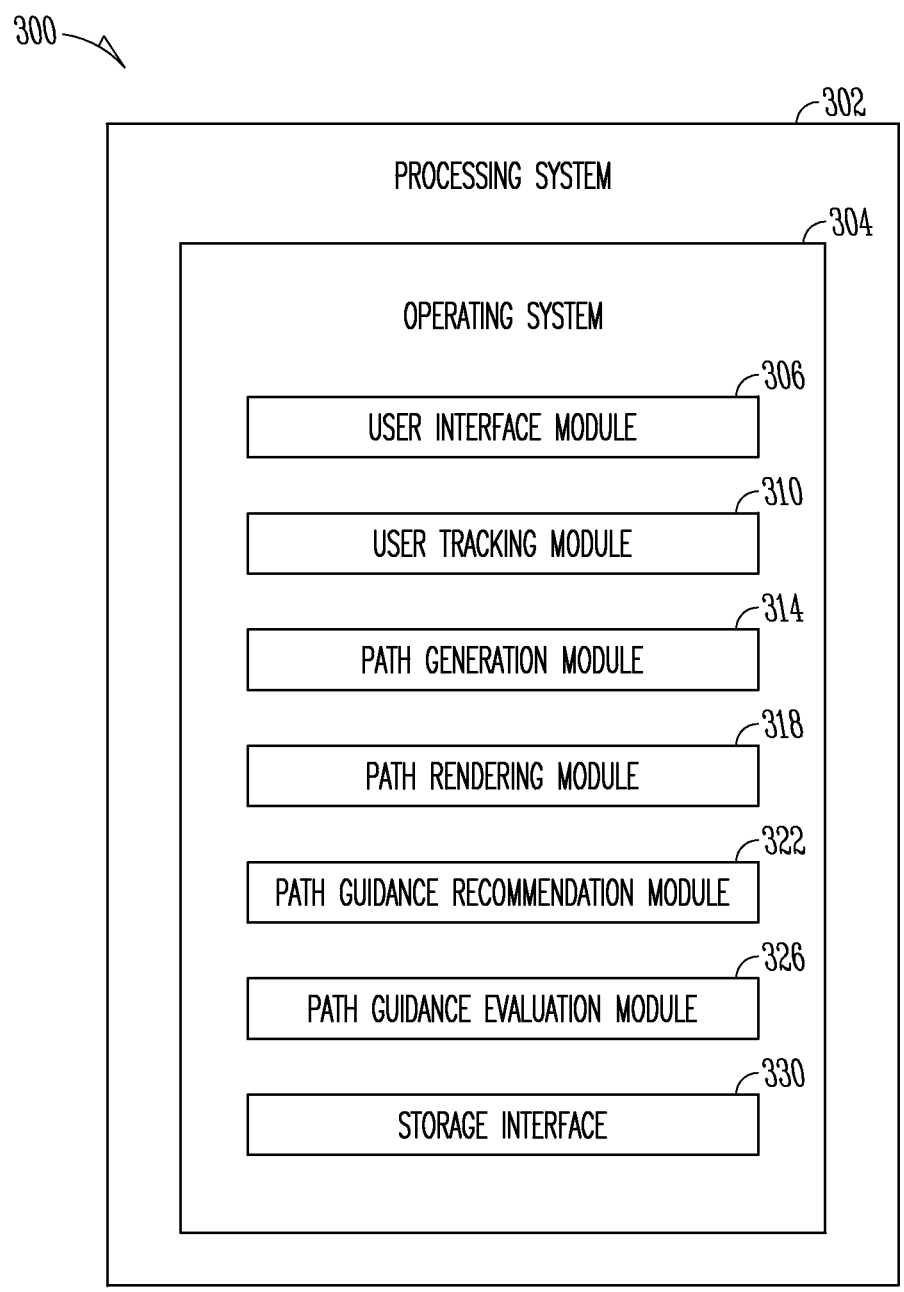
FIG. 3 is a block diagram of an example apparatus, in accordance with an example embodiment, for using ant theory to personalize an experience in an electronic commerce marketplace.

FIG. 3 is a block diagram of an example apparatus 300, in accordance with an example embodiment, for using ant theory to personalize an experience in an electronic commerce marketplace. The apparatus 300 is shown to include a processing system 302 that may be implemented on a client or other processing device that includes an operating system 304 for executing software instructions.

In accordance with an example embodiment, the apparatus 300 may include a user interface module 306, a user tracking module 310, a path generation module 314, a path rendering module 318, a path guidance recommendation module 322, and a path guidance evaluation module 326. In accordance with an example embodiment, the apparatus 300 may further include a storage interface 330.

The user interface module 306 may provide an interface between user device 104-1 and, for example, the path rendering module 318. The user interface module 306 may facilitate the display of a rendered set of paths, as described more fully below in conjunction with FIG. 8.

The user tracking module 310 may track a progress of one or more users through a workflow. In one example embodiment, the user tracking module 310 may receive tracking information from, for example, user device 104-1 and/or item listing and identification processing system 130, and may provide the tracking information to the path generation module 314.

The path generation module 314 may establish one or more paths through a workflow based on the tracking provided by, for example, the user tracking module 310, as described more fully below in conjunction with FIG. 4. As each user traverses a path, the path generation module 314 may increase a weight for the corresponding path or path segment in the data structure representing the set of paths 200. The path generation module 314 may also decrease a weight for a corresponding path or path segment over time to simulate a natural decay of the weight. In one example embodiment, the path generation module 314 may calibrate or re-calibrate the weights corresponding to a set of paths. In one example embodiment, the path generation module 314 may delete or suspend paths with weights that are below a weight threshold.

The path rendering module 318 may generate a graph of a set of one or more paths that may be provided to, for example, user device 104-1 via the user interface module 306, as described more fully below in conjunction with FIG. 5.

The path guidance recommendation module 322 may evaluate a set of one or more paths and their associated weights and may recommend guidance activities to guide a user toward a path that has an increased likelihood of leading to a task completion and/or achieving an objective, as described more fully below in conjunction with FIG. 6.

The path guidance evaluation module 326 may evaluate a set of one or more paths in the data structure representing the set of paths 200 of the workflow and the associated weights at different points in time to determine the effect of a guidance activity, as described more fully below in conjunction with FIG. 7. For example, if a guidance activity is implemented, the weights of the paths associated with the guidance activity before implementation of the guidance activity can be compared with the weights of the paths associated with the guidance activity after implementation of the guidance activity. A successful guidance activity may, for example, result in heavier weights on the path(s) leading to a successful completion of the task than the weight on the same path prior to providing guidance. A successful guidance activity may, for example, result in a higher percentage of users on the set of paths related to the guidance activity completing the associated task or achieving the associated objective after implementation of the guidance activity than before implementation of the guidance activity. In one example embodiment, an evaluation period occurs from prior to the establishment of the guidance activity until a predefined period of time after the establishment of the guidance activity and the value of the weights as defined at the start of the evaluation period and the end of the evaluation period may be compared.

The storage interface 330 may provide an interface to external storage.

Figure 4:
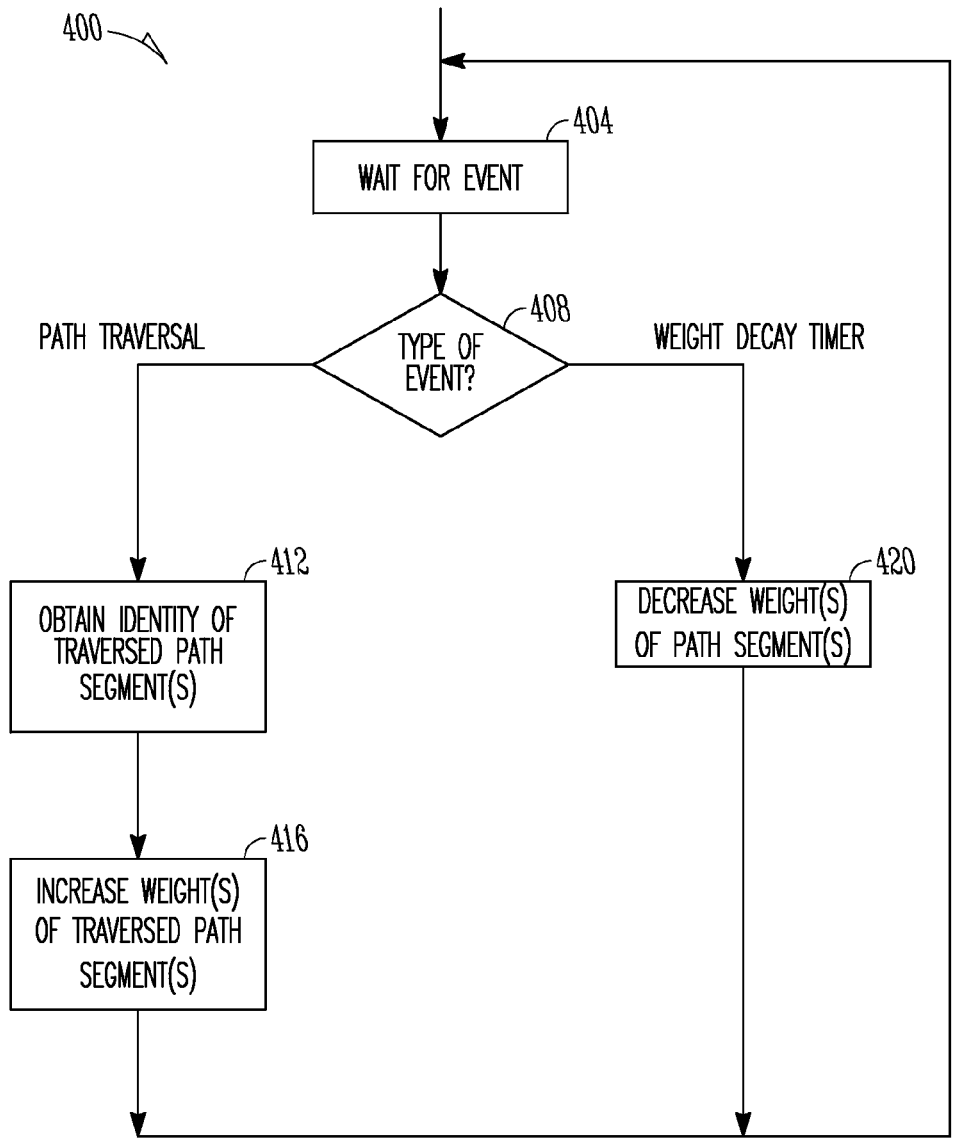
FIG. 4 is an example method for generating a set of one or more paths in a workflow using ant theory, in accordance with an example embodiment.

FIG. 4 is an example method 400 for generating a set of one or more paths, in accordance with an example embodiment. In one example embodiment, the method 400 may be performed by the path generation module 314.

In one example embodiment, the method 400 may wait for an event, such as a report of a path or path segment traversal by a user or a timeout by a weight decay timer (operation 404). If an event is detected, a test may be performed to determine the type of event (operation 408). For example, the user device 104-1 and/or the item listing and identification processing system 130 may inform the path generation module 314 that a user has traversed a path or path segment in a workflow.

If the detected event is a report of a path or path segment traversal by a user, the identity of the path segments traversed by the user may be obtained (operation 412). For example, the identity of the path segment(s) in the data structure corresponding to the workflow may be obtained from the user device 104-1 and/or the item listing and identification processing system 130. The weight of the corresponding path may be increased. For example, the weight of the corresponding path may be increased by a value WEIGHT (operation 416). The method may proceed with operation 404.

If the detected event is a timeout by a weight decay timer, the weight of one or more paths may be reduced (operation 420). For example, the weight may be reduced by a defined percentage, or may be reduced according to a decay formula, such as an exponential decay formula. The weight may be recorded in the data structure representing the set of paths 200 of the workflow.

In one example embodiment, a separate set of path weights may be maintained for a particular set of users. For example, one set of weights may be maintained for retail consumers, one set of weights may be maintained for corporate employees, and the like.

Figure 5:
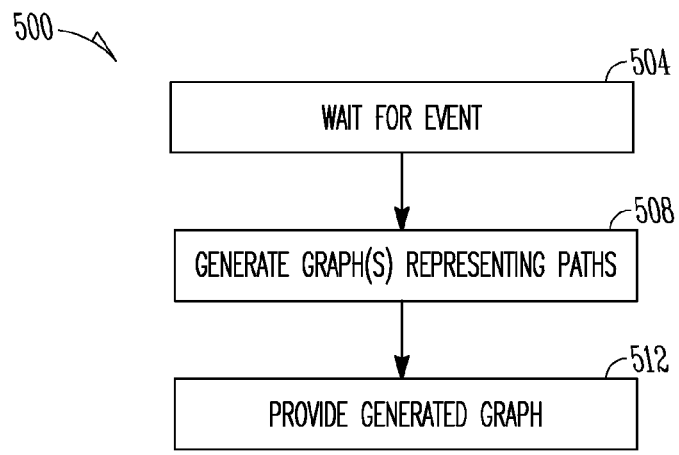
FIG. 5 is a flowchart for an example method for rendering a graph representing a set of one or more paths in a workflow, in accordance with an example embodiment.

FIG. 5 is an example method 500 for rendering a set of one or more paths, in accordance with an example embodiment. In one example embodiment, the method 500 may be performed by the path rendering module 318.

In one example embodiment, the method 500 may wait for an event, such as an update to one or more paths or path segments in the data structure representing the set of paths 200 by the path generation module 314 or a submission of a rendering request from a user (operation 504). For example, a rendering request may be received from the user device 104-1 by the path rendering module 318. In one example embodiment, the rendering request may identify a set of users whose path traversals should be used in generating the graph.

A graph may be generated where each node represents a decision point in a workflow and each edge represents a traversal from one decision point to another decision point (operation 508). Each edge of the graph may comprise one or more weights, as described more fully above. For example, a consumer desiring to purchase a shirt may select a shirt style at a first decision point, may select a shirt color at a second decision point, and may select a payment method at a third decision point. Each decision point may be represented by a node. In one example embodiment, the edges may be marked to indicate the frequency of recent travel by various users and/or a value of a corresponding weight. For example, the paths may be color-coded, where the color of a path may be in the range of blue to red, where blue represents a path with a relatively low value weight and red represents a path with a relatively high value weight. In one example embodiment, paths or path segments having weights that are below a weight threshold may be marked. For example, a dashed line may be used to indicate paths or path segments having weights that are below a weight threshold. As described above, paths or path segments having weights that are below a weight threshold may be ignored in determining guidance activities.

The generated graph may be provided to, for example, user device 104-1 via the user interface module 306 for display to, for example, a sales team member (operation 512).

Figure 6:
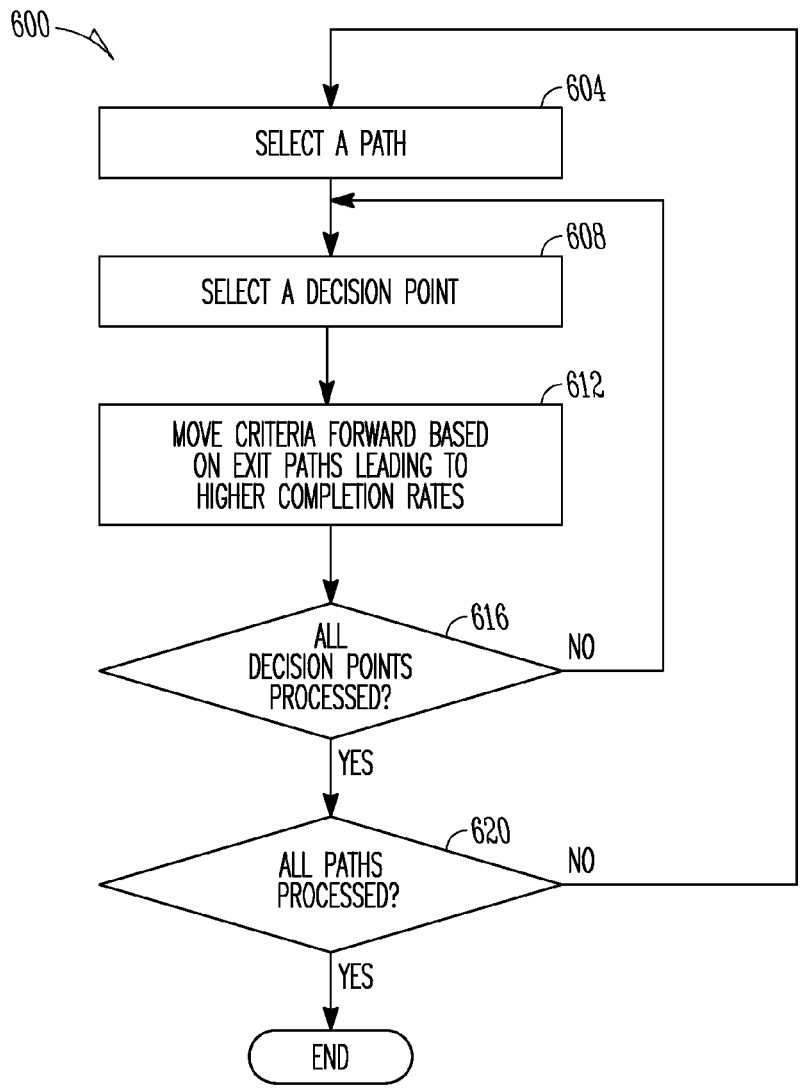
FIG. 6 is a flowchart for an example method for evaluating a set of one or more paths in a workflow and for recommending guidance activities that guide a user toward a path that has an increased likelihood of leading to a task completion and/or achieving an objective, in accordance with an example embodiment.

FIG. 6 is an example method 600 for evaluating a set of one or more paths and the associated weights and recommending guidance activities to guide a user toward a path that has an increased likelihood of leading to a task completion and/or achieving an objective, in accordance with an example embodiment. In one example embodiment, the method 600 may be performed by the path guidance recommendation module 322. In one example embodiment, for each path, each decision point in the path may be evaluated and a guidance activity may be recommended.

In one example embodiment, a path in the data structure representing the set of paths 200 may be selected (operation 604) and a decision point on the selected path may be selected (operation 608). If one or more paths exiting the decision point lead to a higher completion rate or higher achievement rate (known as high performance paths) than the other paths exiting the decision point, then the criteria associated with the high performance path(s) may be presented to the user while the user is at the decision point (operation 612). In one example embodiment, the user may be directed to the high performance path(s). For example, as described more fully above, if the criteria associated with a high performance path is the color blue (in the context of a shirt), then a blue shirt may be presented to a user at the decision point.

A test may be performed to determine if all the decision points on the selected path have been processed (operation 616). If all the decision points on the selected path have not been processed, the method may proceed with operation 608; otherwise, a test may be performed to determine if all the paths have been processed (operation 620). If all the paths have not been processed, the method may proceed with operation 604; otherwise, the method may end.

Figure 7:
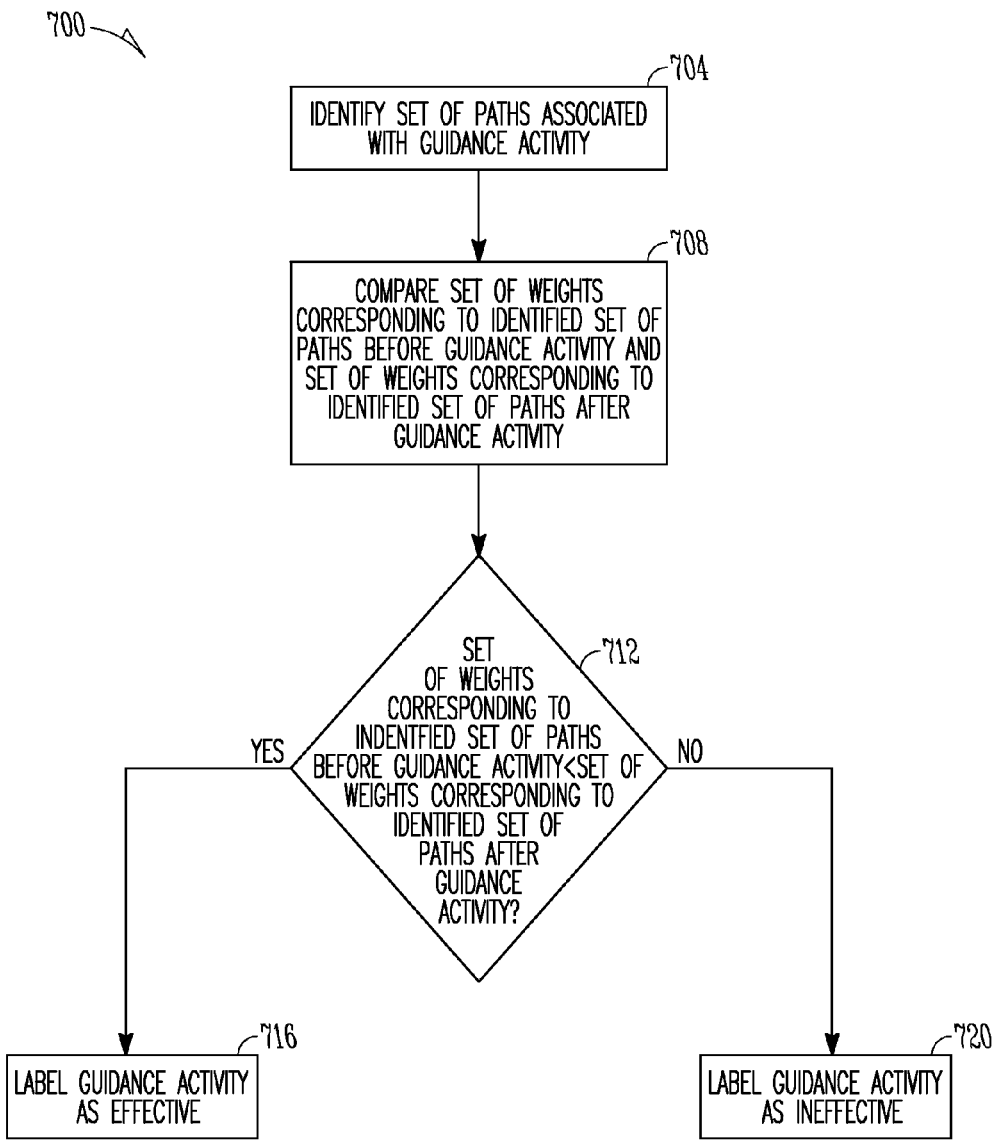
FIG. 7 is a flowchart for an example method for evaluating an effectiveness of a guidance activity, in accordance with an example embodiment.

FIG. 7 is an example method 700 for evaluating an effectiveness of a guidance activity, in accordance with an example embodiment. In one example embodiment, the method 700 may be performed by the path guidance evaluation module 326.

In one example embodiment, a set of paths in the data structure representing the set of paths 200 associated with a guidance activity may be identified (operation 704). For example, the path segments from a selected decision point to a successful completion of a task or a termination of an attempt to complete the task may be identified.

The set of one or more weights corresponding to the identified path segments before an implementation of a guidance activity and a set of one or more weights corresponding to the identified path segments after an implementation of the guidance activity may be obtained and compared (operation 708). For example, a set of one or more weights may be obtained from the data structure representing the set of paths 200.

A test may be performed to determine if the post-guidance activity weights associated with each high performance path are larger than the pre-guidance activity weights associated with high performance path(s) (operation 712). If the post-guidance activity weights associated with the high performance path(s) are larger than the pre-guidance activity weights associated with the high performance path(s), then the guidance activity is labeled as effective (operation 716); otherwise, the guidance activity is labeled as ineffective (operation 720). In one example embodiment, an effectiveness value may be determined by calculating the percentage change in one or more of the cited weights.

Figure 8:
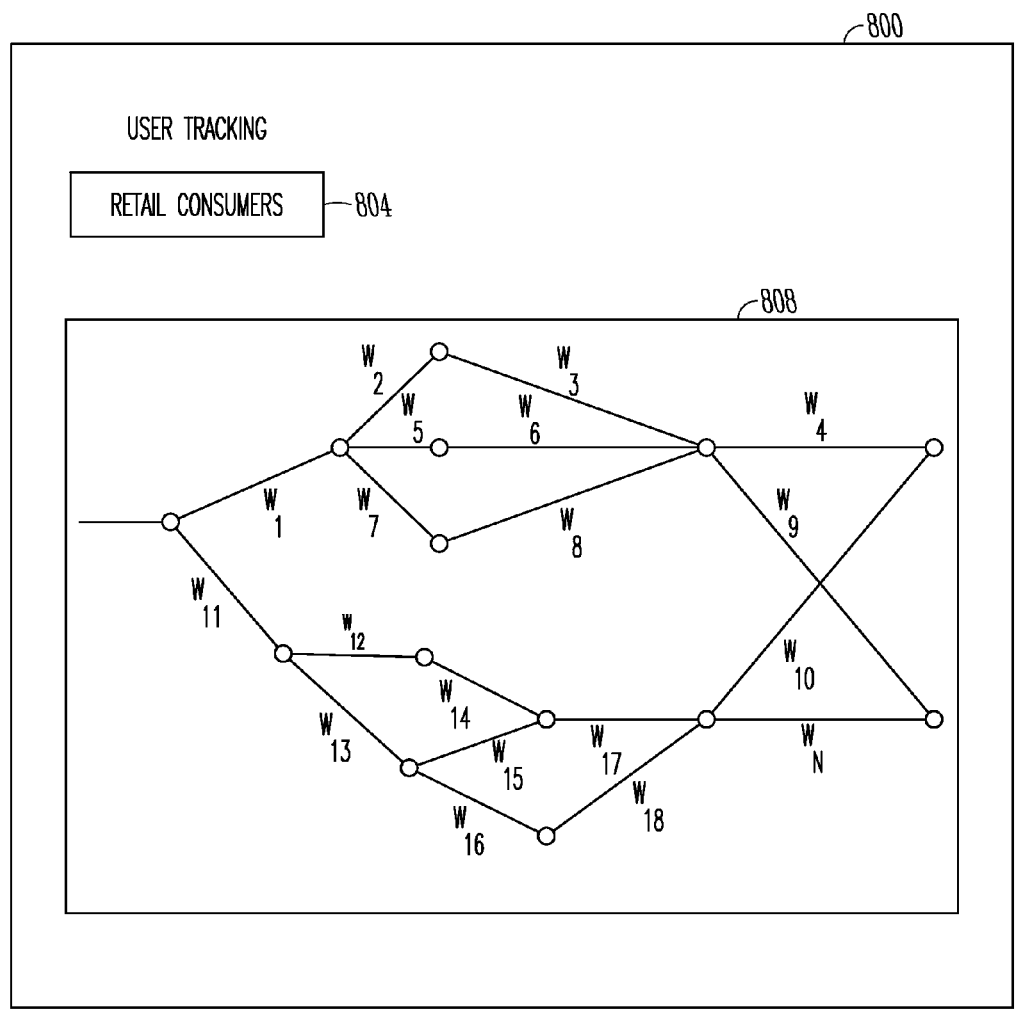
FIG. 8 is a representation of an example user interface for personalizing a web-based experience, in accordance with an example embodiment.

FIG. 8 is an example representation of a user interface 800 for personalizing a web-based experience, in accordance with an example embodiment. The user interface 800 may be provided, for example, by user device 104-1.

In one example embodiment, all users may be automatically tracked. In one example embodiment, an identity of each user in one or more sets of users to be tracked may be entered by a user in user tracking identity field 804. In one example embodiment, an identity of a set of users to be tracked may be entered by a user in user tracking identity field 804. For example, the identity "retail consumers" may be entered in user tracking identity field 804 to identify a set of retail consumers.

In one example embodiment, a rendered set of paths may be displayed in path display area 808.

Although certain examples are shown and described here, other variations exist and are within the scope of the invention. It will be appreciated by those of ordinary skill in the art that any arrangement, which is designed or arranged to achieve the same purpose, may be substituted for the specific embodiments shown. This application is intended to cover any adaptations or variations of the example embodiments of the invention described herein. It is intended that this invention be limited only by the claims and the full scope of equivalents thereof.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiples of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network 115 (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 9:
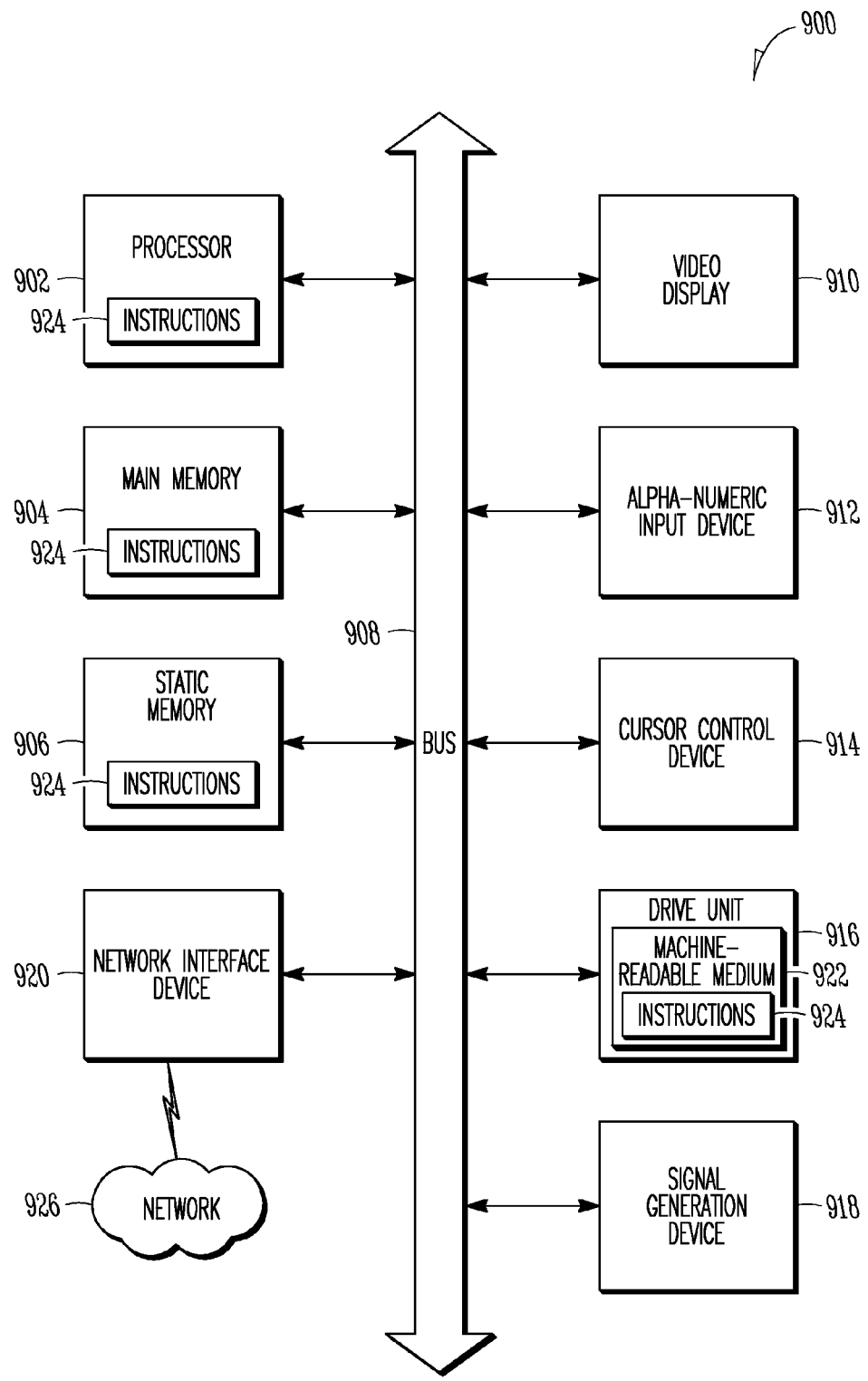
FIG. 9 is a block diagram of a machine within which instructions may be executed for causing the machine to perform any one or more of the methodologies discussed herein.

FIG. 9 is a block diagram of a machine within which instructions may be executed for causing the machine to perform any one or more of the methodologies discussed herein. In one example embodiment, the machine may be the user device 104. In one example embodiment, the machine may be the seller processing system 108. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU) or both), a main memory 904 and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard), a user interface (UI) navigation device 914 (e.g., a mouse), a disk drive unit 916, a signal generation device 918 (e.g., a speaker), and a network interface device 920.

Machine-Readable Medium

The disk drive unit 916 includes a machine-readable medium 922 on which is stored one or more sets of instructions and data structures (e.g., software) 924 embodying or utilized by any one or more of the methodologies or functions described herein. The instructions 924 may also reside, completely or at least partially, within the main memory 904 and/or within the processor 902 during execution thereof by the computer system 900, the main memory 904 and the processor 902 also constituting machine-readable media. Instructions 924 may also reside within the static memory 906.

While the machine-readable medium 922 is shown in an example embodiment to be a single medium, the term "machine-readable medium" may include a single medium or multiple media (e.g., a centralized or distributed database, and/or associated caches and servers) that store the one or more instructions 924 or data structures. The term "machine-readable medium" shall also be taken to include any tangible medium that is capable of storing, encoding or carrying instructions 924 for execution by the machine and that cause the machine to perform any one or more of the methodologies of the present invention, or that is capable of storing, encoding or carrying data structures utilized by or associated with such instructions 924. The term "machine-readable medium" shall accordingly be taken to include, but not be limited to, solid-state memories, and optical and magnetic media. Specific examples of machine-readable media 922 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 924 may further be transmitted or received over a communications network 926 using a transmission medium. The instructions 924 may be transmitted using the network interface device 920 and any one of a number of well-known transfer protocols (e.g., HTTP). Examples of communication networks include a local area network ("LAN"), a wide area network ("WAN"), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 924 for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An apparatus for generating weights of a workflow, the apparatus comprising:
   a processor; and
   memory to store instructions that, when executed by the processor, cause the processor to perform operations comprising:
   increase one or more decay-based weights, each decay-based weight associated with a path segment of a path in a workflow traversed by a user, each decay-based weight being stored in a data structure, each decay-based weight being configured to decrease based on a temporal decay rate;
   decrease the one or more decay-based weights in the data structure based on the temporal decay rate; and
   establish a guidance activity that directs a user to a more heavily weighted path segment at a workflow decision point, wherein the guidance activity moves criteria of a latter step in a workflow to an earlier decision point.

2. The apparatus of claim 1, further comprising instructions that, when executed by the processor, cause the processor to:
   normalize one or more of the decay-based weights.

3. The apparatus of claim 2, wherein the normalization is based on a non-linear scale.

4. The apparatus of claim 1, wherein the increase of the one or more decay-based weights is performed for a single traversal of the path.

5. The apparatus of claim 1, wherein the guidance activity reduces a count of exit paths from a decision point in a workflow.

6. The apparatus of claim 1, further comprising instructions that, when executed by the processor, cause the processor to:
   delete a path comprising one or more path segments having decay-based weights smaller than a weight threshold.

7. The apparatus of claim 1, further comprising instructions that, when executed by the processor, cause the processor to:
   evaluate an effectiveness of a guidance activity.

8. The apparatus of claim 7, further comprising instructions that, when executed by the processor, cause the processor to:
   calculate a percentage change in a decay-based weight of a path segment during an evaluation period.

9. The apparatus of claim 8, wherein the evaluation period occurs from prior to the establishment of the guidance activity until a predefined period of time after the establishment of the guidance activity.

10. The apparatus of claim 1, further comprising instructions that, when executed by the processor, cause the processor to:
    maintain a set of decay-based weights in the data structure for each of a plurality of sets of users.

11. The apparatus of claim 1, further comprising instructions that, when executed by the processor, cause the processor to:
    mark one or more path segments based on a corresponding weight.

12. A method for generating weights of a workflow, the method comprising:
    increase one or more decay-based weights, each decay-based weight associated with a path segment of a path in a workflow traversed by a user, each decay-based weight being stored in a data structure, each decay-based weight being configured to decrease based on a temporal decay rate;
    decrease the one or more decay-based weights in the data structure based on the temporal decay rate; and
    establish a guidance activity that directs a user to a more heavily weighted oath segment at a workflow decision point, wherein the guidance activity moves criteria of a latter step in a workflow to an earlier decision point.

13. The method of claim 12, further comprising deleting a path comprising one or more path segments having decay-based weights smaller than a weight threshold.

14. The method of claim 12, further comprising evaluating an effectiveness of a guidance activity.

15. The method of claim 12, further comprising maintaining a set of decay-based weights in the data structure for each of a plurality of sets of users.

16. A non-transitory computer-readable medium embodying instructions that, when executed by a processor, perform operations comprising:
    increase one or more decay-based weights, each decay-based weight associated with a path segment of a path in a workflow traversed by a user, each decay-based weight being stored in a data structure, each decay-based weight being configured to decrease based on a temporal decay rate; and
    decrease the one or more decay-based weights in the data structure based on the temporal decay rate; and
    establish a guidance activity that directs a user to a more heavily weighted path segment at a workflow decision point, wherein the guidance activity reduces a count of exit paths from a decision point in a workflow.

* * * * *